April 8, 1952 — U. A. ALFREDEEN — 2,592,103
COUPLING
Filed March 28, 1946
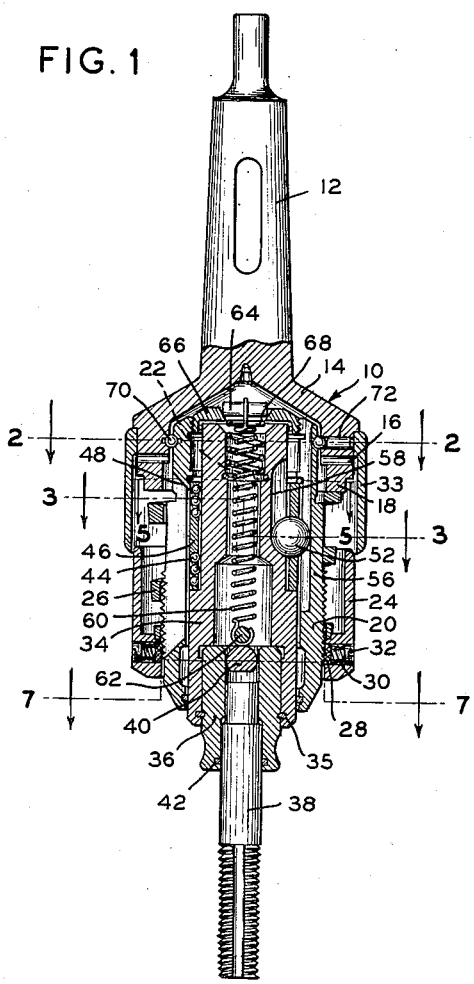
FIG. 1
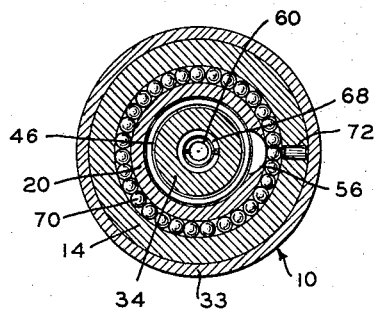
FIG. 2
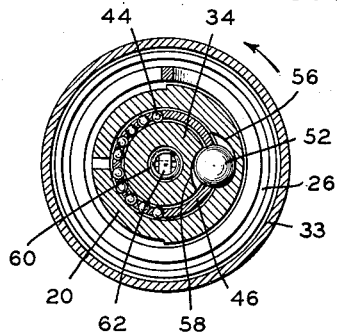
FIG. 3
FIG. 4
FIG. 6
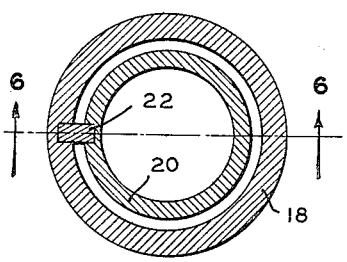
FIG. 5
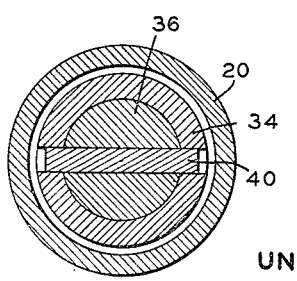
FIG. 7
INVENTOR.
UNO ALLAN ALFREDEEN
BY
*Jarvis C. Marble*
ATTORNEY Patented Apr. 8, 1952

2,592,103

UNITED STATES PATENT OFFICE 2,592,103

COUPLING

Uno Allan Alfredéen, Stockholm, Sweden, assignor to Aktiebolaget Svenska Precisionsverktyg, Nacka, Sweden, a corporation of Sweden Application March 28, 1946, Serial No. 657,858
In Sweden March 28, 1945

2 Claims. (Cl. 64—23)

This invention relates to thread cutting apparatus of the type provided with a driving member intended to be connected to the rotating part of a machine, and with another member driven by said first-mentioned member and carrying a thread-cutting tool, there being provided balls between the two members, said balls permitting a relative axial movement between said members.

The main object of the invention is to provide a thread cutting apparatus of the class described, wherein the axial movement of the driving member on the operation of the apparatus relative to the driven member takes place with a minimum of friction, even where great torques are transmitted between the members. Other objects of the invention are to provide a thread cutting apparatus, having a considerable length of life and a comparatively small mass to reduce the influence of the forces of inertia in braking the apparatus upon the termination of a thread cutting operation.

According to one feature of the invention the balls bear with an initial pressure on surfaces of the members, and the torque is transmitted between these members otherwise than by the balls. According to another feature of the invention, the thread cutting apparatus is provided with one or more torque transmitting rolling members arranged between the members, said rolling members having a greater diameter than the balls under the initial pressure. Inasmuch as the balls do not transmit any torque, they may have a very small diameter so as to be light. Furthermore, a number of balls may be arranged about the circumference of the members, whereby the initial pressure, which is of material importance in causing the axial movement of the driven member to take place with a rolling movement of the balls and to cause such movement to be taken care of at a number of places without any sliding friction. This aids furthermore in reducing the friction upon the axial movement of the driven member, while the deformation of the member produced by the balls will be considerably reduced.

Further objects and advantages of the invention will be apparent from the following description considered in connection with the accompanying drawings, which form a part of this specification, and of which:

Fig. 1 is an axial sectional view through a thread cutting apparatus made according to the invention;

Figs. 2 and 3 are sectional views taken on the lines II—II and III—III, respectively, of Fig. 1;

Fig. 4 shows a portion of a ball holder developed in a plane;

Fig. 5 is a fragmentary section taken on the line V—V of Fig. 1;

Fig. 6 is a fragmentary view taken on the line VI—VI of Fig. 5; and

Fig. 7 is a section taken on the line VII—VII of Fig. 1.

In the drawings the driving member mentioned hereinbefore is generally designated by 10. It comprises a shaft 12 adapted to be inserted in known manner into the spindle of a thread cutting machine and having its one end widened to form a sleeve shaped portion 14. This portion has at the edge surface thereof cams 16 engaging corresponding cams on a locking ring 18. In addition the driving member comprises a sleeve shaped guide body 20, which is in driving connection with the locking ring 18 through pins 22, as seen more clearly in Figs. 5 and 6. Threaded on the external side of the guide body 20 is a sleeve 24 serving as an abutment and a protection for a spring 26, the cross section of which preferably decreases from one end of the spring toward the other. In addition, the spring 26 bears on the locking ring 18 so as to keep the cams thereof in engagement with the cams 16. The tension of the spring is adjustable by means of the protective sleeve 24, which is locked in the desired position by one or more stops 28 pressed against the guide body 20 with the aid of springs 30. The latter and the stops engage radial bores in the sleeve 24, said bores being closed by screws 32. The spring 26 is surrounded by a sleeve 33, which is connected to the sleeve shaped portion 14.

In the figures the above-mentioned driven member is denoted by 34, which is concentrically arranged in the body 20 and which also comprises a holder 36 for a screw tap 38 or a screw die. The holder 36 is caused to rotate with the driven member 34 by a bolt 40, as seen from Fig. 7. The bolt 40 acts only to transmit torque, axial displacement between the parts 34 and 36 being prevented by the snap ring 35 (Fig. 1). A resilient ring 42 prevents the screw tap 38 from falling out while exerting at the same time a pressure thereon from all sides.

Inserted between two cylindrical surfaces of the members 20, 34 are a great number of small balls 44 distributed round the circumference thereof. These balls are kept in their position during the assembly of the apparatus by a ball holder 46. According to the invention the guide body 20 is pressed upon the member 34 and the balls 44 distributed thereabout, in a manner such that the guide body will bear on the balls with an initial pressure. The guide body 20 may have a longitudinally extending recess 48 between the end portions thereof, said recess facilitating the expansion of the guide body during the prestressing operation. As will appear from Fig. 4, wherein 50 designates the apertures in the ball holder 46 for the balls 44, the latter are successively displaced relative to each other in the peripheral as well as in the axial direction. They may be arranged in groups comprising three balls each, which are alternately disposed in the upper and in the lower part of the holder 46, a line connecting the balls within each group then forming an angle to a generatrix of the holder. Each ball has its own rolling race on the two bodies 20, 34. Moreover, the distance between two such rolling races may be less than the diameter of a ball and consequently the total number of balls may be great. After the members 20, 34 have been assembled, the relative position of the balls will be fixed by the rolling contact between the members rather than by the holder 46.

The torque is preferably transmitted between the guide body 20 and the member 34 through a single ball 52, the diameter of which is many times greater than that of the balls 44. The position of the ball 52 is fixed by the holder 46, which for this purpose is provided with a corresponding recess 54. The ball 52 enters an axial recess 56 in the guide body 20 and an axial recess 58 in the member 34, said recesses having a circular cross section with a radius of curvature greater than that of the ball. In addition, the recess 58 has a greater depth in the member 34 than does the recess 56 in the guide body 20, so that the ball 52 will always roll, and consequently not slide against the two recesses upon axial movement of the member 34. Inasmuch as the balls 44 have a small diameter, the points at which the transmission of the moment between the ball 52 and the two members 20, 34 takes place will be located on radii having almost the same length.

The driven member 34 is suspended with its holder 36 by a spring 60, which also balances said element while being secured with the one end thereof to a pin 62 arranged in said member and with the other end thereof in a holder 64, which is supported by a cap 66 threaded into the guide body 20. A second spring 68, which is stronger than the spring 60 but shorter, is inserted between the cap 66 and an abutment in the member 34. The springs 60, 68 may be wound in opposite directions. The spring 68 has for its object to impart a certain resiliency to the driven member 34, when the screw tap 38 is brought into contact with the work piece, so that the thread first cut in the bore hole will not be deformed or damaged.

The torque is transmitted from the shaft 12 over the cams 16 to the locking ring 18 and from the latter to the guide body 20. From this guide body the torque proceeds through the ball 52 to the member 34 and to the screw tap 38. Now, if the resistance from the screw tap 38 exceeds a certain value, the cams 16 provided with oblique contact surfaces will overcome the pressure of the spring 26, so that the locking ring 18 jumps on said cams and the movement of the screw tap ceases. In such cases the shaft 12 will rotate relative to the guide ring 20. Inserted between the portion 14 and the guide body 20 is an annulus of balls 70 serving as a bearing for this relative movement. The balls 70 are introduced through a radial bore 72, normally closed by a stopper. In the present case the balls 70 also fix the relative axial position of the members 14 and 20.

While one more or less specific embodiment of the invention has been shown, it is to be understood that this is for purpose of illustration only, and the invention is not to be limited thereby, but its scope is to be determined by the appended claims.

What I claim is:

1. A device of the character described comprising a driving member and a driven member, said members being mounted for relative axial movement and having radially spaced confronting bearing surfaces, a plurality of balls located in the space between said members and bearing against said surfaces, the diameter of the balls being so related to the radial extent of the space between said surfaces that the balls are under an initial prestressing pressure, and means for transmitting torque from the driving member to the driven member comprising axially extending bearing surfaces on each of said members, said bearing surfaces being concavely curved in transverse cross section, and a ball having a radius less than the radius of curvature of said bearing surfaces located between said members to simultaneously engage said bearing surfaces.

2. A device of the character described comprising a driving member and a driven member, said members being mounted for relative axial movement and having radially spaced confronting bearing surfaces, a plurality of balls located in the space between said members and bearing against said surfaces, the diameter of the balls being so related to the radial extent of the space between said surfaces that the balls are under an initial prestressing pressure, one of said members being of sleeve-like form surrounding the other member and said sleeve-like member being longitudinally slotted to permit elastic expansion of the member when the balls are introduced between the members, and means engaging both of said members for transmitting torque from the driving member to the driven member.

UNO ALLAN ALFREDÉEN.

REFERENCES CITED

The following references are of record in the file of this patent:

UNITED STATES PATENTS

| Number | Name | Date |
|---|---|---|
| 846,079 | Yost | Mar. 5, 1907 |
| 1,936,139 | Montgomery | Nov. 21, 1933 |
| 2,311,815 | Briney | Feb. 23, 1943 |
| 2,371,330 | Irstad | Mar. 13, 1945 |
| 2,422,775 | Conner | June 24, 1947 |

FOREIGN PATENTS

| Number | Country | Date |
|---|---|---|
| 462,587 | Great Britain | Mar. 11, 1937 |